April 2, 1968     A. L. NASVYTIS     3,375,739
CONICAL PLANETARY FRICTION GEAR DRIVE
Filed Feb. 17, 1966     3 Sheets-Sheet 1
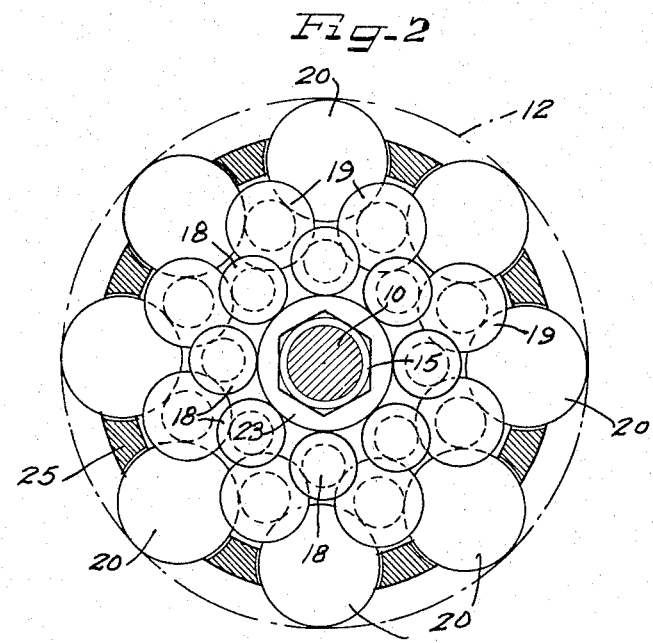
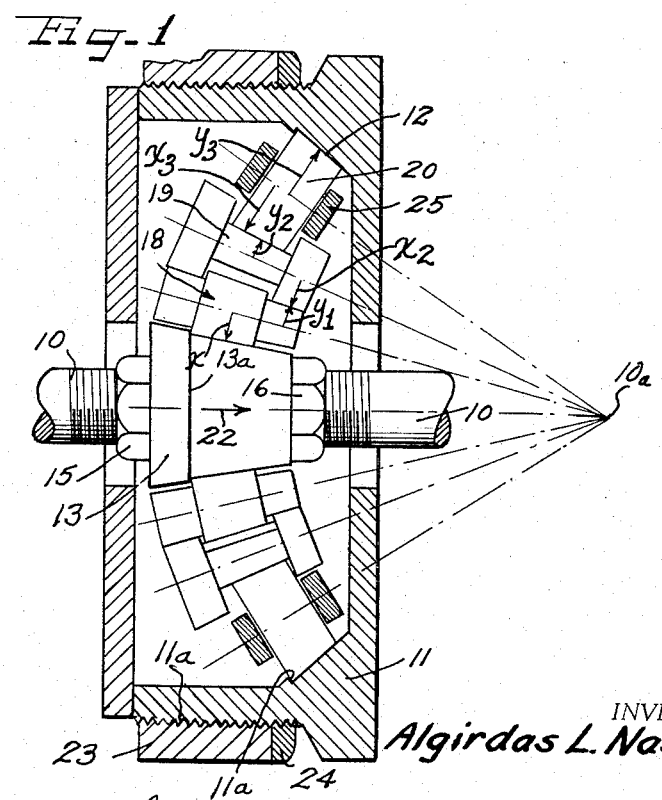
INVENTOR.
Algirdas L. Nasvytis April 2, 1968  A. L. NASVYTIS  3,375,739
CONICAL PLANETARY FRICTION GEAR DRIVE
Filed Feb. 17, 1966  3 Sheets-Sheet 2
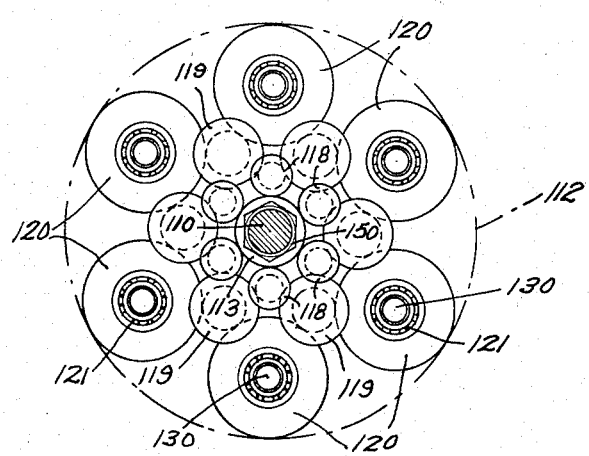
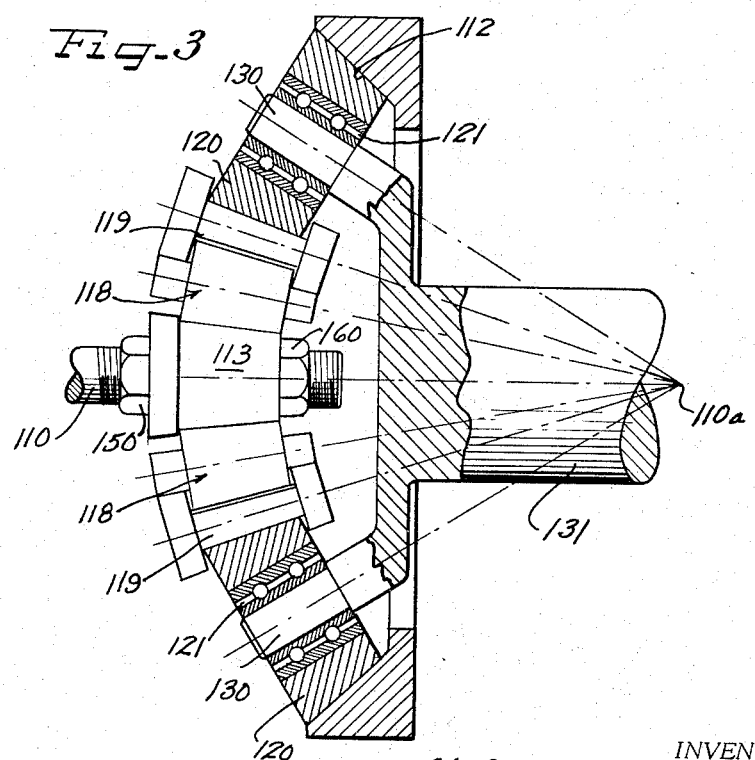
INVENTOR.
*Algirdas L. Nasvytis*
BY  ATTORNEYS April 2, 1968        A. L. NASVYTIS        3,375,739
CONICAL PLANETARY FRICTION GEAR DRIVE
Filed Feb. 17, 1966        3 Sheets-Sheet 3
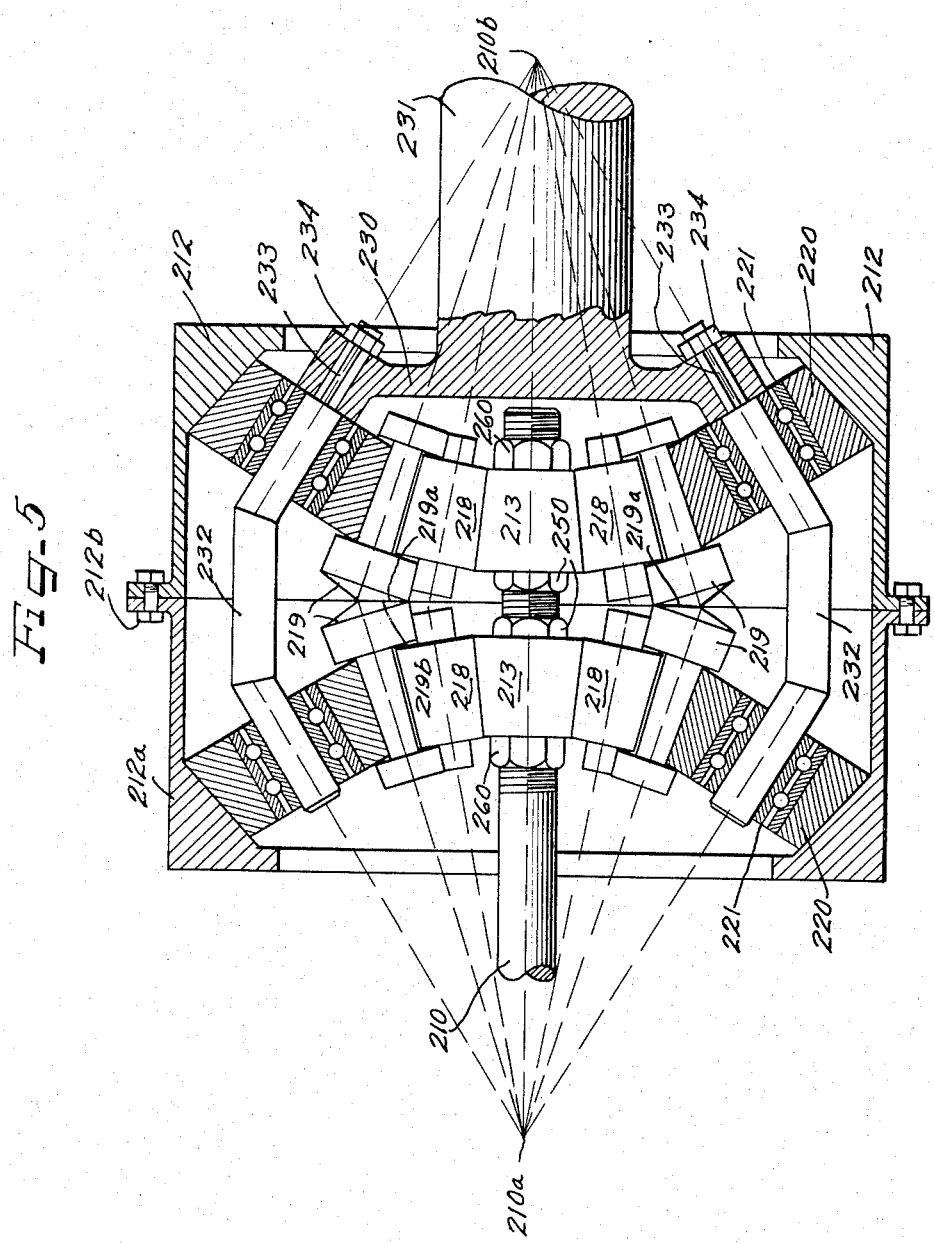
INVENTOR.
Algirdas L. Nasvytis

United States Patent Office

3,375,739
Patented Apr. 2, 1968

3,375,739
CONICAL PLANETARY FRICTION GEAR DRIVE
Algirdas L. Nasvytis, Cleveland, Ohio, assignor to TRW Inc., Cleveland, Ohio, a corporation of Ohio
Filed Feb. 17, 1966, Ser. No. 528,164
1 Claim. (Cl. 74—798)

ABSTRACT OF THE DISCLOSURE

An axially loadable friction planetary drive system employing a plurality of rows of planet members positioned between frusto-conical sun and ring members. Axial loading of the system is provided for in both directions of axial thrust by co-operating end faces of one of the rows of planet members.

---

It is, of course, well known in the art of gearing that thrust loads in bearings or drive line systems may successfully be carried by bearings having a generally frusto-conical cross-sectional configuration. For example, bearings well known and marketed under the name Timken. However, in actual practice such bearings are relatively limited in their maximum rotational speed. In fact, in conventional practice it has been found that Timken roller bearing configurations are unacceptable for operation at any speeds in excess of approximately 6,000 r.p.m. In accordance with the principles of the present invention, however, extremely high rotational speeds whether under load or no load drive conditions, are readily accommodated in a manner providing relatively slow speed planetary rotation coupled with uniformly excellent bearing surface loads.

As I have described in my prior, copending applications, highly efficient planetary type friction gear systems have been constructed and operated. However, such systems have required great care in the manufacture of the components thereof in order to be assured of satisfactory preload contact between the drive components. Although such preload has been successfully accomplished with respect to my earlier drive systems, nevertheless the provision of simple preload adjustment means has posed significant problems. Additionally, prior art systems, including my prior applications above mentioned, have been capable of accepting bearing loads transversely applied relative to the drive shaft but have been unable to accommodate axial components of force.

In accordance with the principles of the present invention, a truly simple gear reduction system is provided in which a minimum of care is necessary to maintain satisfactory operation of the mechanism. By constructing the components in all cases of tapered bearings, axial thrust loads may be applied to the system and successfully carried by it. Still further, however, by the utilization of tapered bearings in the drive system of the present invention, an extremely accurate preload may be accomplished and, more particularly, the preload may readily be adjusted, even after assembly and operation of the device in the field. Accordingly, a truly commercially satisfactory drive or bearing system has been accomplished which is capable of simple installation and maintenance in the field and which is, further, capable of operation at extremely high sun shaft rotational speeds and in the presence of very substantial axial shaft loads.

It is, accordingly, an object of the present invention to provide a novel, and substantially improved, planetary system.

A feature of the invention resides in the provision of a planetary gear bearing operable to provide anti-friction support for a member rotating at extremely high angular velocities.

Still another feature of the invention is the provision of a planetary system capable of operation at a torque transmitting system.

Still a further object of the invention is the provision of a high-speed shaft bearing support.

Yet a further feature of the invention comprises the provision of an axially loadable planetary system accommodating a wide variation in drive preload.

Still a further object and feature of the present invention is to provide a novel high-speed thrust bearing.

Still other and further objects and features will at once become apparent to those skilled in the art from a consideration of the attached drawings and specification wherein two embodiments of the invention are shown, by way of illustration only, and wherein:

FIGURE 1 is a side-elevational view of a first embodiment of the present invention operationally arranged for utilization as a line shaft bearing;

FIGURE 2 is an end-elevational view of the system illustrated in FIGURE 1, shown generally schematically for ease of interpretation;

FIGURE 3 is a side-elevational view of a second embodiment of the present invention operationally arranged as a planetary torque transmission and thrust bearing system;

FIGURE 4 is an end-elevational view of the system shown in FIGURE 3, generally schematically shown to provide for ease of understanding; and FIGURE 5 is a side-elevational view of a third embodiment of the present invention providing full two-way thrust support.

As shown on the drawings:

In the embodiment of the invention illustrated in FIGURE 1, a line shaft bearing support is seen. In this embodiment, a shaft 10 is supported for high-speed rotation relative to a stationary support 11. Although the support 11 is shown arranged to rotationally carry a shaft 10 in a generally horizontal position, it will be clear from a consideration of the arrangement that the shaft 10 may be supported in a generally vertical condition by the bearing of the present invention, with the bearing acting to provide thrust support.

As shown, the fixed support 11 is provided with a generally conical annular race 12. The shaft 12 carries a frusto-conical sun member 13 which may be integral therewith but which is preferably separably mounted thereon in an axially adjustable position by means of abutments 14 and 15 respectively threaded to the shaft by threads 16 and 17. A multiplicity of rows of planet members, indicated generally at 18, 19 and 20, are positioned between the sun 13 and the internally facing race or ring surface 12. As may be seen from a consideration of FIGURE 1, the axes of rotation of the planets 18, 19 and 20 intersect at a point on the axis of the shaft 10, as indicated at 10a. With this arrangement, all of the elements rotate with substantially completely rolling friction. Annular stop surfaces 11a and 13a are provided to assure that axial movement of the rollers in the direction of disassembly is prohibited.

It is desired that the system shown in FIGURES 1 and 2 provide extremely high-speed shaft support. This is best accomplished through the provision of compound rollers. Thus, the rollers 18 are provided with a first radius $x_1$ contacting the sun 13 and a second radius $y_1$ contacting the drive radius $x_2$ of rollers 19. The output of rollers 19 is taken from reduced diameter portion of a radius $y_2$ which is in drive contact with the simple rollers 20. With the multiple roller system illustrated the ratio of rotation between the shaft 10 and the planetary rollers 20, planetating about the axis of shaft 10 is $$R = \frac{cx_1x_2x_3}{ay_1y_2y_3} + 1$$

In the embodiment illustrated the diameters $x_3$ and $y_3$ are identical so that the ratio is, effectively, $$R = \frac{cx_1x_2}{ay_1y_2} + 1$$

A ratio on the order of $R=100$ is readily accomplished in such a system with the result that extraordinarily high thrust bearing loads may be successfully provided. As those well versed in the art of bearings are aware, the standard Timken bearing, which comprises a frusto-conical sun and a single row of planets, operating within a peripheral race, is subject to extreme stress and begins to rapidly deteriorate under load at shaft speeds providing a rotational planetary speed of the Timken rollers of over 6,000 r.p.m. about the axis of the sun shaft. Since, in actual practice, the Timken bearing comprises relatively small diameter rollers in combination with a relatively large diameter sun and a comparable ring, the ratio comprises $$R = \frac{c}{a} + 1$$

and thus the shaft speed, in practice, is ordinarily only slightly in excess of two times the value of 6,000 r.p.m. On the other hand, in accordance with the present system, shaft speeds on the order of 300,000 r.p.m. are possible with a cluster speed of planetary rotation of the planets 18, 19 and 20 about the sun of only 3,000 r.p.m., well within practical limits of continuous operation. In addition to the extremely high speed shaft support thus accomplished, it will be observed that due to the conical configuration, thrust loads acting in the direction of the arrow 22 are absorbed by the system. Accordingly, the system may be employed as a shaft support for vertically arranged shafts, acting to absorb the gravitational load. Alternatively, the bearing may be employed as one of a pair at the outboard ends of a motor-rotor element, vehicle wheel, or the like in which installation it is desirable that all axial slack be removed in both directions.

Still further, as a result of the provision of a relatively axially movable sun 13, the preload of the system may readily be modified where shaft 10 is axially restrained. Thus, if axial motion of the shaft 10 is restrained by other bearings, not illustrated, or by the utilization of another identical conical bearing oppositely positioned, the bearing load on the planets 18, 19, 20, as well as the sun 13 and the ring 12, may readily be increased by axial movement of the sun 13 toward the right as viewed in FIGURE 1 relative to the ring surface 12. As a result of this adjustability, the most efficient bearing load may be achieved, namely a relationship in which all of the surfaces are in light contact. It will be manifest, of course, that in situations in which the sun 13 is rigid with the shaft 10, preload may be modified by providing for axial shifting movement of the main supports 11. This may, for example, be accomplished through the utilization of a threaded surface 11a co-operable with a rigid outer element 23. Rigidity of such adjustment may be improved through the provision of a lock nut 24 or similar conventional position-retaining construction.

In order to provide positional stability for all of the rollers 18, 19 and 20, it is essential that a peripheral restraining element be provided for at least one of the rows of planets. This may be seen from a consideration of FIGURE 2 in which a cage 25 is provided. The cage 25 operates to peripherally fix the relative positions of the respective rollers 20. In considering FIGURE 2, it will be seen that the conical nature of the elements is dispensed with in order to permit ready identification of the contact surfaces.

In the embodiment of the invention illustrated in FIGURES 1 and 2, the device comprises a freely rotating bearing system. Thus, as there shown, no torque is transmitted. The tapered bearing system is, however, also particularly useful in connection with a planetary system drive in which the sun is rotated at a high rate of speed and an output is taken from one of the rows of planets. Such an arrangement is shown in FIGURES 3 and 4.

As shown in FIGURE 3, a centrally positioned drive shaft 110 is provided with a frusto-conical or tapered sun 113. Compound rollers 118 and 119 and simple rollers 120 are provided between the sun 113 and the conical ring surface 112. As in the preceding embodiment, the axes of rotation and the surfaces of contact of the sun, rollers 118, 119, 120 and the ring 112 intersect the axis of rotation of shaft 110, as shown at 110a. In the embodiment shown in FIGURES 3 and 4, the rollers 120 are rotatably mounted, by means of roller bearings 121 upon stub axles 130 carried by output shaft 131. By this arrangement, the rollers 120 are precisely peripherally spaced so that no cage such as the cage 25 employed in the embodiment of FIGURES 1 and 2, is necessary to provide constant alignment and, hence, stability. As in the case of the embodiment of FIGURES 1 and 2, the torque-transmitting system of FIGURES 3 and 4 may be adjusted for various preloads by the axial movement of sun member 113 relative to shaft 110 by means of adjusting nuts 150 and 160. In the case of a torque-transmitting system the preload becomes increasingly important since it must be increased somewhat for the efficient transmission of increasingly greater torques. Similarly, as in the case of the bearing of FIGURES 1 and 2, the torque-transmitting system of FIGURES 3 and 4 not only accepts the transmission of rotary torque, but also acts as a support bearing and a thrust bearing for the shaft 110 relative to the shaft 131. The tremendous ratio advantage available in the torque-transmission system of FIGURES 3 and 4 is identical to that of the bearing of FIGURES 1 and 2. Thus, the ratio R of speed between the shaft 110 and the output shaft 131 is $$R = \frac{cx_1x_2x_3}{ay_1y_2y_3} + 1$$

Accordingly, the rotational speed of the output shaft 131, and the rollers 120, 119, and 118 about the shaft 110 is successfully retained at a very small figure relative to the speed of shaft 110. For example, at a shaft speed of 300,000 r.p.m. for the shaft 110, it is practical to obtain a rotational speed of 3,000 r.p.m. at shaft 131, which shaft speed will not load any of the bearing surfaces in the system beyond practical limits as conventionally employed in commercially available bearings.

In FIGURE 5, a modification is shown illustrating one form of dual-direction thrust support system. There the input is at sun members 213 adjustably secured for rotation with shaft 210 by way of adjusting nuts 250 and 260. As may be seen, the system of FIGURE 5 is essentially a double FIGURE 3 type structure. Thus the output is via carrier 230 supporting planets 220 by bearings 221 and driven by intermediate planets 218 and 219. Ring members 212 and 212a are identical and are secured at 212b after assembly. Since support shafts 232 are bent, they are removable from carrier 230 for assembly with the rollers 220. The connection 233 comprises a keyed relationship to prevent relative rotation between the shafts 232 and carrier 230, and after assembly, nuts 234 are tightened to provide an integrated structure.

In the embodiment of FIGURE 5, the rollers 219 are shown in abutting contact at 219a. The surfaces 219b are conical and contacting along a line radial to the shaft 210. This provides pure rolling contact on the surfaces 219b and, at the same time, axially limits movement of the rollers in each planetary system without additional stop such as 13a in FIGURE 1.

It will, accordingly, be seen that I have provided a novel planetary system capable of providing axial, as well as radial, bearing support for extremely high speed operation and capable of extremely simple adjustment of surface-to-surface preload adjustment. It will be apparent to those skilled in the art that many utilities may be found for systems of this type. For example, extremely high-speed turbine shafts may be mounted on the thrust bearing drive of the present system since most turbine rotors not only operate at high speed but operate in the presence of axial shaft loads. Similarly, vaned compressor shafts may well be driven and supported in the manner hereinabove illustrated. It will be understood, further, that variations may be made in the structure described without departing from the scope of the novel concepts of the present invention. For example, it will be clear that the preload of the system may be adjusted not only by axial movement of the sun or output shafts relative to each other, but may also be modified by changing the angle of inclination of the axes of rotation of the planets to provide a greater wedging component. This may be accomplished by providing for the intersection of the axes of rotation at a point axially further removed from the sun 13 than the point 10a shown in the drawings. Similarly, it will be observed that the number of rows of planet rollers may be varied, if desired, and that the cage 25 may be arranged to provide fixed peripheral spacing for rows of planets other than the planets 20 in the embodiment illustrated in FIGURE 2. Further, the dual system illustrated in FIGURE 5 may be employed as a bearing structure as shown in FIGURE 1 by eliminating shaft 231 from the carrier or roller support 230; and the direction of taper may be revised on the ring and sun members if desired, although annular stops such as 13a should be used with such a reversed construction.

In view of such possible changes and variations, it is my intention that the scope of the present invention be limited solely by the scope of the hereinafter appended claim.

I claim as my invention:
1. In combination in a planetary system, a rotatable shaft member, a dual frusto-conical sun element having its axis of rotation coincident with the axis of rotation with said shaft and connected for support thereon, an annular frusto-conical ring member and a plurality of rows of frusto-conical planet roller members in line contact between said sun and said ring whereby said sun is rotatably supported against radial and at least one direction of axial movement relative to said ring, the axes of said planets converging to the axis of said shaft, said ring member comprising a pair of frusto-conical surfaces facing each other and embracing two sets of planet roller elements contacting respective oppositely facing frusto-conical surfaces of said sun element whereby thrust loads are carried in both axial directions, the rollers of one row of planetary roller elements of opposite sets having conical end surfaces axially aligned with each other and having rolling end contact with each other.

References Cited

UNITED STATES PATENTS

| | | | |
|---|---|---|---|
| 622,207 | 4/1899 | Collins | 74—798 |
| 1,117,446 | 11/1914 | Rodefeld | 74—798 |
| 1,993,051 | 3/1935 | Dell et al. | 74—798 |
| 2,306,475 | 12/1942 | Wahl | 74—798 X |
| 3,048,058 | 8/1962 | Chery | 74—798 |
| 3,207,004 | 9/1965 | Chery | 74—798 |
| 3,224,300 | 12/1965 | Chery | 74—798 |

FOREIGN PATENTS

| | | |
|---|---|---|
| 483,703 | 5/1917 | France. |
| 665,767 | 2/1934 | Germany. |
| 450,292 | 7/1949 | Italy. |
| 494,348 | 5/1954 | Italy. |

ROBERT M. WALKER, *Primary Examiner.*

LEONARD H. GERIN, *Examiner.*